United States Patent [19]
Renfroe

[11] 3,784,166
[45] Jan. 8, 1974

[54] LEVEL WIND DRUM
[75] Inventor: Walter D. Renfroe, Geneva, N.Y.
[73] Assignee: Terra Marine Scoop Company, Inc.
[22] Filed: Dec. 1, 1971
[21] Appl. No.: 203,778

[52] U.S. Cl. .............................. 254/186, 254/190
[51] Int. Cl. ............................................. B66d 1/00
[58] Field of Search ................... 254/190, 150, 186, 254/187; 242/117, 157.1

[56] References Cited
UNITED STATES PATENTS

| 636,809 | 11/1899 | Keenan | 187/19 |
| 2,555,676 | 6/1951 | Clark | 254/185 |
| 2,370,029 | 2/1945 | Gillespie | 254/185 |
| 3,079,130 | 2/1963 | Le Bus | 242/157.1 |

FOREIGN PATENTS OR APPLICATIONS

| 302,023 | 3/1917 | Germany | 254/190 |
| 526,862 | 9/1940 | Great Britain | 254/157.1 |

Primary Examiner—Allen N. Knowles
Attorney—Harvey B. Jacobson

[57] ABSTRACT

A drum for hoist, winches, pullers, and the like having a substantially cylindrical member provided with longitudinally spaced end portions and a winding surface having a diameter at a point at each end portion which is less than the diameter at a point substantially equidistant between the end portions for permitting a level wind action onto the drum of a line passing through a fairlead or sheave assembly.

6 Claims, 4 Drawing Figures

PATENTED JAN 8 1974　　　　　　　　　3,784,166
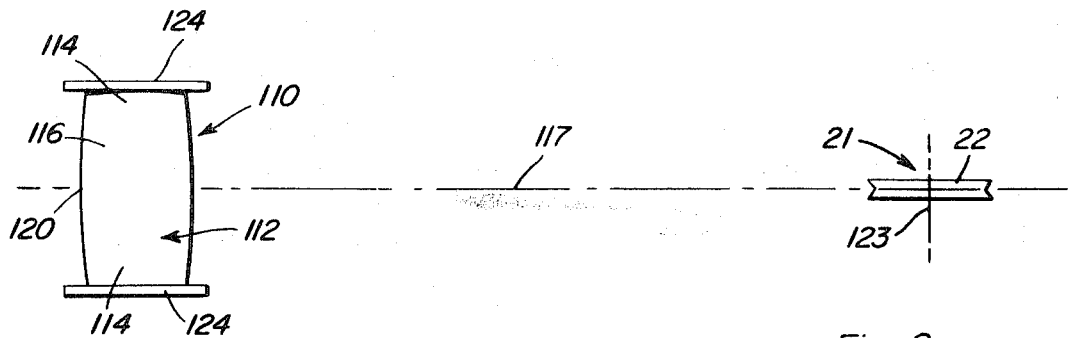
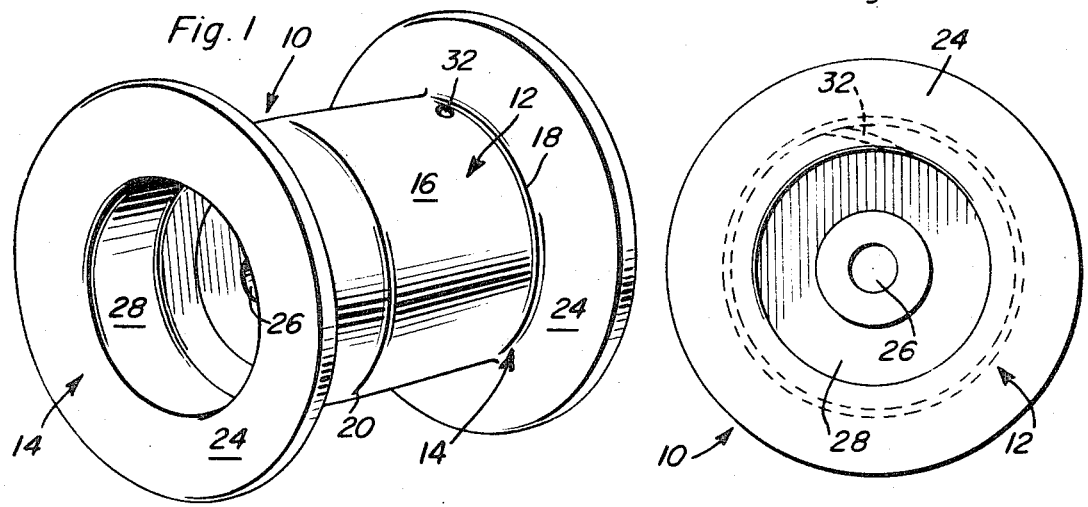
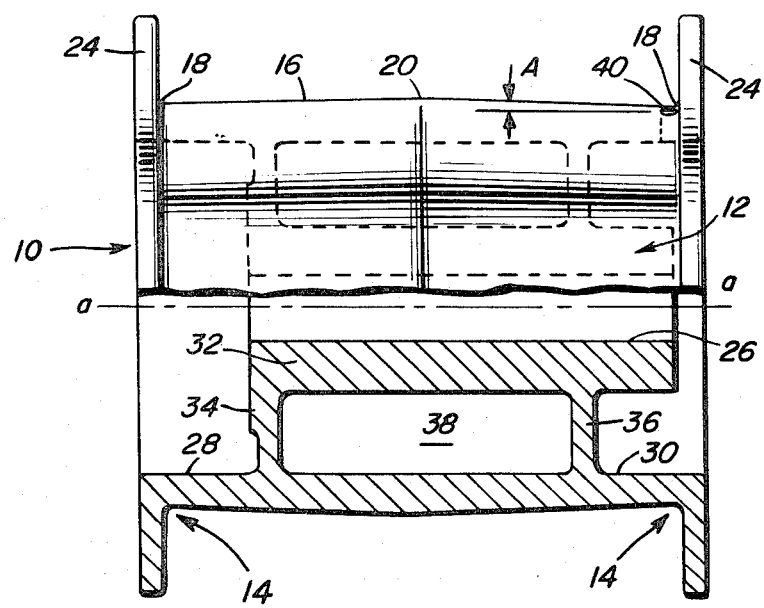

LEVEL WIND DRUM

BACKGROUND OF THE INVENTION

1. Field of the Invention

This invention relates to a drum which permits a level wind action thereon of a line passing through a fairlead or sheave assembly spaced from the drum. In particular, this invention relates to a drum which permits a level wind action while using less than normal fleet angles.

2. Description of the Prior Art

It is known to pull a rope, especially a wire rope, through a fairlead type sheave onto a drum. The common manner of achieving a level wind onto the drum is to use fleet, grooves on the winding surface of the drum, or apparatus which oscillates longitudinally with respect to the drum. When employing fleet, the critical factor is the fleet angle which is a function of the distance between the drum and the sheave assembly. By selecting a proper spacing between these two elements, the rope will be caused to slip along the winding surface of the drum.

In certain situations, however, it is not practical to space the sheave assembly from the drum a sufficient distance to achieve a level wind action. It may be, for example, that where a spacing of 39 feet is necessary, perhaps only 9 ½ feet are available. Such a situation arises in, for example, my co-pending and commonly owned application U.S. Ser. No. 183,854 filed Sept. 27, 1971, which discloses a portable high-speed dredging scoop in which the winch and the sheave assembly are arranged on the back of a motor vehicle.

SUMMARY OF THE INVENTION

It is an object of the present invention to provide a drum for hoist, winches, pullers, and the like that will permit a level wind action while using less than normal fleet angles. It is a further object of the present invention to provide a drum of the above type which permits the storage of rope, especially cable, sufficient to extend to above average distances from the drum.

These and other objects are achieved according to the present invention by providing a drum having a substantially cylindrical member provided with longitudinally spaced end portions and a winding surface having a diameter at a point at each end portion which is less than the diameter at a point substantially equidistant between the end portions for permitting a level wind action onto the drum of rope passing through a, for example, head sheave.

A preferred embodiment of a drum according to the present invention has flanges dimensioned for permitting the storage of sufficient rope on the drum to extend to above average distances. Bore means are provided for mounting the drum on a shaft.

One preferred embodiment of the present invention has the winding surface extend linearly from each end portion at an angle in the range of 2° to 3° with respect to the longitudinal axis of the cylindrical member.

In another preferred embodiment according to the present invention, the winding surface is curved convexly along a radius equal to the distance from the point equidistant between the end portions to the axis of rotation of the head sheave.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a drum according to the present invention.

FIG. 2 is an end elevational view showing the drum of FIG. 1.

FIG. 3 is a side elevational view, partly in section, showing the drum of FIGS. 1 and 2.

FIG. 4 is a schematic plan view showing a modified embodiment of a drum according to the present invention.

DESCRIPTION OF THE PREFERRED EMBODIMENTS

Referring first to the embodiment shown in FIGS. 1 to 3 of the drawings, a drum 10 has a substantially cylindrical member 12 provided with longitudinally spaced end portions 14 and a winding surface 16 of circular cross section and having a diameter at a point 18 of each end portion 14 which is less than the diameter at a point 20 substantially equidistant between end portions 14 for permitting a level wind action onto the drum of rope (not shown) passing through a guide assembly 21 having a head sheave or pulley 22 (FIG. 4).

End portions 14 have flanges 24 dimensioned for permitting the storage of sufficient rope, preferably wire rope, on the drum to extend to above average distances. A bore means 26 is provided for mounting the drum on a shaft (not shown) in a known manner. Drum 10 is further provided with recesses 28, 30 and a hub portion 32 defining bore means 26. Webs 34, 36 connect hub portion 32 to cylindrical member 12. Webs 34, 36 partially define, along with hub portion 32 and cylindrical member 12, a cylindrical bore 38. This particular construction provides a light-weight yet rigid drum. A rope socket 40 is provided in cylindrical member 12 for attaching the rope or cable thereto in a suitable, known manner.

In the embodiment of FIGS. 1 to 3, winding surface 12 extends linearly from each end portion 14 at an angle A in the range of 2 to 3 degrees with respect to the longitudinal axis a—a of cylindrical member 12. This axis a—a passes through the end portions 14, as is shown in FIG. 3 of the drawings.

FIG. 4 shows an alternative embodiment of a drum according to the present invention. Drum 110 has a substantially cylindrical member 112 provided with longitudinally spaced end portions 114 and a winding surface 116. Winding surface 116 is curved convexly along a radius 117 equal to the distance from a point 120 on winding surface 116 which is equidistant between end portions 114 to an axis of rotation 123 of head sheave 22.

Thus, it can be readily understood that by generating the winding surface 16, 116 as either an angle (FIGS. 1 to 3) or a radius (FIG. 4), winding surface 16, 116 will permit a rope to be spooled through a fairlead type sheave and onto a drum 10, 110 with level wind action. The winding surface 16, 116 will cause the rope to slip therealong by effectively increasing the fleet angle to achieve the level winding. That is, winding surface 16, 116 will always be essentially perpendicular to the longitudinal extent of the rope. The enlarged flanges 24, 124, permit sufficient rope to be stored on drum 10, 110 to permit operation at great distances.

Drums 10, 110 may be fabricated as by casting from cast iron, malleable iron, steel, or the like. The winding surface 16, 116 is then subsequently machined. The sizes and materials of drums 10, 110 may vary for particular requirements. Drums 10, 110 may be for single or multiple drum hoists, winches, pullers, and the like. The size of bore means 26 will vary with the size of drums 10, 110, which drums may vary in size depending upon rope size and capacity desired. For a five-sixteenths inch diameter cable, for example, flanges 24, 124 are approximately 12 inches in diameter, and winding surface 16, 116 is approximately 9 inches in diameter and 16 inches in length. Bore means 26 for such a drum 10, 110 is approximately 3 inches. Drums 10, 110 may be constructed as a single casting, or, alternatively, flanges 24, 124 may be cast separately and welded to the cylindrical member 12, 112.

A drum according to the present invention thus makes it possible for the distance between the drum and a sheave assembly to be reduced from, for example, 39 feet to, for example, 9 ½ feet, while still permitting level wind action of a rope onto the drum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The combination of a line winding drum, a line having a longitudinal extent and attached to the drum for winding thereon, and a guide sheave assembly spaced from the drum a distande less than the distance necessary to provide a normal fleet angle for the line between the sheave assembly and drum, said drum comprising a substantially cylindrical member of substantially circular cross-section forming a winding surface and provided with spaced end portions, the diameter of the rotary member being slightly greater at its central portion than at its end portions and forming a means for keeping the winding surface essentially perpendicular to the longitudinal extent of the line and enabling the drum and sheave assembly to be relatively closely spaced to one another while maintaining level winding of the line onto the drum by increasing the fleet angle.

2. A structure as defined in claim 1, wherein said end portions include flanges dimensioned for permitting the storage of sufficient rope on the drum to extend to above average distances, and the drum is further provided with bore means including a hub portion and recesses for mounting the drum on a shaft.

3. A structure as defined in claim 2, wherein said cylindrical member has a longitudinal axis passing through the end portions, and said winding surface extends linearly from each end portion at an angle in the range of 2° to 3° with respect to the longitudinal axis of the cylindrical member.

4. A structure as defined in claim 2, wherein said winding surface is curved convexly along a radius equal to the distance from a point on the winding surface equidistant between the end portions to an axis of rotation of the sheave.

5. A structure as defined in claim 1, wherein said cylindrical member has a longitudinal axis passing through the end portion, and said winding surface extends linearly from each end portion at an angle in the range of 2° to 3° with respect to the longitudinal axis of the cylindrical member.

6. A structure as defined in claim 1, wherein said winding surface is curved convexly along a radius equal to the distance from a point on the winding surface equidistant between the end portions to an axis of rotation of the sheave.

* * * * *